No. 780,293.                                    Patented January 17, 1905.

UNITED STATES PATENT OFFICE.

THOMAS B. JOSEPH, OF SAN FRANCISCO, CALIFORNIA.

METAL-LEACHING PROCESS.

SPECIFICATION forming part of Letters Patent No. 780,293, dated January 17, 1905.

Application filed May 18, 1904. Serial No. 208,596.

*To all whom it may concern:*

Be it known that I, THOMAS B. JOSEPH, a citizen of the United States, residing at San Francisco, in the county of San Francisco and State of California, have invented certain new and useful Improvements in Metal-Leaching Processes, of which the following is a specification.

My invention has reference to a metal-leaching process for extracting gold, silver, nickel, zinc, copper, or tin from ore containing the same when in a suitable condition.

A special object of my invention is to provide a process for extracting said metals from ore which can be used on base, oxidized, mixed, or graphite ore and which will not be neutralized by the presence of soluble iron, arsenic, tellurium, or sulfur in the ore and which will leach both roasted or unroasted ore, tailings, or ore slimes, either in the stationary tanks or revolving cylinders, without the unnecessary waste of cyanid by any soluble iron.

It must be understood that I cannot state definitely how fine the ore should be crushed, as loose sand ore should be leached in its natural state, unless the gold therein was coated over with a film of silica, in which case such sand ore should be pulverized finer to break through the silica films to enable the gold to be exposed to the metal-solvent solution.

Soft ore should not be crushed as fine as hard or base ore, the fineness of crushing depending entirely upon the quality, impenetrability, and hardness of the ore to be leached.

Some of the concentrated pyritic ore should be ground to a fine powder of two hundred mesh or finer to the linear inch to get the best and quickest extraction.

In carrying out my invention after the ore has been properly prepared, as aforesaid, I subject the same to the leaching solution containing water, sodium cyanid, bicarbonate of ammonium, bromo cyanid, barium dioxid, hydrate of calcium, and compressed air, the compressed air being forced upwardly therein from the bottom from an air-compressor. In carrying out my process it may be used in such vessels or tanks or revolving cylinders as have been found to be the most practical in the metal-leaching methods heretofore used.

If there were no carbon dioxid with the ammonia in this new solution, then the ammonia therein might decompose some of the cyanogen into its component parts and ruin its power to dissolve gold; but the carbon dioxid from the ammonium bicarbonate protects the cyanogen from such destruction. The cyanogen and the cyanogen bromid in this solution dissolve the precious metal, while the ammonium dissolves not only some silver, but also the copper, nickel, and zinc, if any therein, and thereby causes a better extraction of the silver, as well as of the gold, with this solution than the straight cyanid process would obtain, as the ammonium therein holds the most of the dissolved copper, zinc, and nickel leached from the ore and prevents them from occupying so much of the cyanid as they otherwise would. When it is desired to extract much copper, silver, nickel, or zinc, as well as the precious metals, from ore with this solution, one should increase the quantity of the ammonium bicarbonate therein accordingly; but when it is only the precious metals in the ore to be extracted then only a small quantity of the ammonium bicarbonate need be used. Whenever there are small amounts of the extracted metals left in this solution, as there always are after the common practice of precipitation as heretofore used, said small amounts are always a benefit to act as a binding agent to unite the molecules of the metal solvents to the dissolved metals, which not only gives greater chemical stability to the metal solvents, but they also give to the solution important oxidizing qualities to rapidly absorb oxygen from the air, to rapidly transform the injurious salts of iron, sulfur, and arsenic into an inert condition as to the process. If there is any of the ferrocyanid of zinc, the ferrocyanid of copper, the zinc cyanid, the sulfocyanid, or the ferrocyanids remaining in this solution, any of them are also good solvents of the gold therein, as the barium and compressed air will neutralize the injurious parts of sulfur and iron.

The leaching solution, containing water, sodium cyanid, ammonium bicarbonate, bromocyanid, barium dioxid, and hydrate of calcium, is prepared in the storage-tank, or the ammonium bicarbonate or any one or more of the chemicals might also be dissolved in water and added into the leaching solution while on the leaching ore after the same has been partially leached, if desired.

Many of the injurious salts of iron, arsenic, or sulfur are readily oxidized by this process or transformed into compounds insoluble or inert as to the solution. This metal-solvent solution may be run into the ore several times to give the ore different leachings, if desired, and its upward inflow will generally give better results than the opposite direction. The carbon dioxid helps to more effectively dissolve the small amount of the calcium hydrate, if any in the solution, so that a lesser amount of the calcium than heretofore was the custom with the oxid of calcium is sufficient in this process, as the more finely divided calcium is the better enabled to more quickly and deeply penetrate the ore to neutralize the ore acids of sulfur or arsenic before they could much injure the metal-solvent solution.

It will be remembered that too much of the calcium hydrate should not be used nor too small an amount of the ammonium bicarbonate, because too small an amount of the carbon dioxid from the ammonium bicarbonate, if no compressed air were used, might precipitate some of the calcium if too much of the calcium hydrate were used, while if a larger proportion of the carbon dioxid than of the dissolved calcium were used it would dissolve the late precipitated calcium, if any therein, and also clarify the solution. The compressed air is conveyed upwardly in the tank of ore being leached in any approved manner for the purpose of agitating the ore, as well as to furnish plenty of oxygen and nitrogen therein to aid the work of the metal solvents in the extraction of the metals from the ore, and also to help to neutralize the soluble iron and sulfur or other injurious substances therein, as well as to help to protect the cyanogen, with its carbon dioxid, from the attacks of any soluble iron. The compressed air is also very beneficial to aid this solution during the extraction of the metals from ore slimes when plenty of this solution is used. Great care must be taken, however, not to admit the compressed air under too great a pressure at the start in leaching ordinarily-prepared ore, as channeling of the ore might result, which would retard the leaching of the ore between the channels. Therefore the compressed air should be turned on slowly and its force be gradually increased to the desired amount. The compressed air is also beneficial to help to convey the slimes, if any therein, to the top to aid the percolation of the solution through the ore, as well as to transform some of the said injurious salts of iron, arsenic, and sulfur into the inert condition as to the solution.

The compressed air prevents much of the unnecessary consumption of the cyanid and greatly increases the capacity of the mill by keeping the solution warm and from freezing in winter.

I might use the liquid bromid, diluted with water, in this metal-solvent solution; but on account of the inconvenience in getting freighted the liquid bromin or the bromo-cyanid crystals I prefer to use the bromo-cyanid solution, which is easily prepared by liberating the bromin from the mixed bromo salts—such as the bromid or bromate, or both—of sodium or potassium, or both, at the mill, with an acidulous solution of water, into which a proper proportion and strength of sodium-cyanid solution is therewith immediately mixed as soon as the bromin is liberated from the mixed bromo salt.

The bromid or bromate, or both, of either sodium or potassium, or of both, even though the same contains some chlorid or carbonate, or both, of sodium or potassium, or both, and either with or without a slight proportion of some other inert material, can be used for the source from which to liberate the bromin to be immediately mixed with the strong cyanid solution to prepare the bromo-cyanid solution to be used in this metal-solvent process, or the bromo cyanid may be obtained from any well-known practical method for this purpose. I convey the bromo cyanid thus prepared into the general stock of the metal-solvent solution as it is desired to be used and generally use about enough of the bromo cyanid to contain about two ounces of bromin to the ton of the metal-solvent solution, though I do not confine myself to any particular proportion of bromin or bromo cyanid therein nor to the exact steps when applied nor to the mode from which the bromo cyanid is obtained, as some ores will require a larger or a less amount of bromin or bromo cyanid, and also vary the proportions of the other chemicals in the solution.

As it is expedient not to have any more of the cyanid-destroying compounds in the ore than can easily be helped, it is sometimes advisable to remove the cyanid-destroying compounds, if any therein, by washing the ore with water or with water and compressed air or with lime water or with lime water and compressed air before the leaching of the ore is commenced and then use in the cyanid solution ammonium bicarbonate, hydrate of calcium, barium dioxid, bromo cyanid, and compressed air while the ore is being leached of its metals to neutralize any remaining cyanid-destroying compounds.

When it is desired to hasten the process of leaching or to prevent the solution from freezing in winter, the compressed air may be heated with steam or with a heating-furnace through which a coil of the air-pipe passes or by both methods, if desired.

I wish to be understood as distinguishing between the use of calcium hydrate and oxid of lime, as I lay no claim to the use of oxid of lime, for the reason that the dissolving of the latter into the calcium hydrate when drowned in the leaching solution is so slow that the sulfur or arsenic in the ore might injure the cyanid solution, the cyanid or bromo cyanids, or ammonium cyanids of the precious metals before the oxid of lime was dissolved, thus rendering its use of but little or no benefit to neutralize the sulfur or arsenic in the ore until after they had done their harmful work. Calcium hydrate, compressed air, barium dioxid, and ammonium bicarbonate in this solution immediately neutralizes the most of the baseness or refractory nature of the ore, and thereby prevents that injury to the cyanid solution. The calcium hydrate will form an insoluble compound with the arsenic, if any is exposed on the ore, while the barium of the barium dioxid will form the insoluble barium sulfate with the free sulfur in the ore.

As a general rule there should be used in proportion to one ton of the water of the solution about two pounds of the sodium cyanid, about one pound of ammonium bicarbonate, enough of the bromo-cyanid solution to contain about two ounces of bromin, about four ounces of barium dioxid, and enough of the calcium hydrate to contain about one pound of the oxid of lime before being dissolved in the water, in addition to the compressed air to be used therein while the ore is being leached, which compressed air can also be used in the solvent solution to give the same an aeration before it is run on the ore to be leached, if desired, though I do not limit myself to the exact amounts or proportions of the chemicals to be used to the ton of the water nor to the exact steps in the manner or mode of obtaining or mixing or using of a stronger or weaker solution or a different proportion of the chemicals therein will be found beneficial on some ores, as circumstances may require. The addition of these chemicals thereto and the compressed air assist the leaching to such a degree that a less amount of the sodium cyanid can be used than heretofore has been the custom on some ores, even where any dust of the oxid of lime or dry slaked lime has been added or scattered into the ore when the same was dumped into the tank to be leached in order to sweeten the same to prevent any bad odor that might afterward occur when taking out the tailings.

It must be understood that no hard or fast rules will be applied and that different conditions of ore must be considered in the successful work of this process.

When desiring to finish the leaching of a tank of ore, a wash-water should be run through it to wash out as much as is convenient of the remaining solution of the metals as may have remained therein and be saved to again be used as a wash-water, or as a leaching solution, if desired, or for a part of it to be used to replenish to the normal quantity the stock solution, if wished, which latter should also have the strength of its chemicals replenished from time to time, as desired, to additionally leach the same or future ore. In this way the wash-water may be used over and over again as a wash-water as often as wished to wash the same or other ore by having its quantity increased after the metals are precipitated therefrom, as desired, the pipes connecting the different tanks, pumps, and air-compressor being provided with stopcocks to control and regulate the flow of the different solutions and also the compressed air.

In some cases it might be found advantageous to run this metal-solvent solution through a quantity of crushed limestone to more purify the solution by the absorption of the impurities into the limestone of one-half inch cubes, if desired.

If the ore to be leached contains much copper, zinc, or nickel, then more of the ammonium bicarbonate should be used in this solution than when the ore contains only the precious metals to be leached therefrom.

To extract precious metals from powdered ores containing tellurium or arsenic or bismuth with this process, it will sometimes be found advantageous to first separate the arsenic or tellurium or bismuth therefrom by agitating the ore with compressed air or machine stirring, or both, in a solution of water containing ferrous chlorid and overflowing them away from the ore to be leached instead of roasting out those injurious elements, which process is another one of my inventions.

When this process solution has been used to extract metals from ore slime, one could afterward use salt water of a greater specific gravity to displace this metal solvent containing the dissolved metals therefrom or pass the solvent and slimes without filtering through quicksilver containing sodium amalgam to take out the precious metal, if desired, and then through a swift-running centrifugal mill to separate the slime tailings from the solution either before or after running it through the sodium amalgam, if desired.

If at any time the precipitation of the precious metal is not quite as good as desired, it might be found advantageous to add about two ounces of sodium sulfid, or more, of the hydrate of calcium to the ton of the metal solvent before trying to precipitate the metals therefrom to aid their precipitation. The copper, zinc, or nickel may be precipitated out of this solution separately by different currents of electricity or with an alkaline sulfid or with a small amount of caustic sodium and sodium sulfid or by any well-known method. However, if one desired to separate the precipitation of the metals by the latter methods he should gradually admit small quantities of the sodium-sulfid solution therein first, and only enough to throw down only the copper first, and after separating the solution therefrom then add a small sulfid solution to throw down the other metals as desired. The gold and silver may be precipitated by electricity or by filtering the metalline solution through spongy metals or metal shavings or finely-divided zinc or zinc shavings or by agitating the metalline solution with compressed air while adding zinc-dust or any finely-divided metals therein more electropositive than the gold or silver in an ammoniacal cyanid solution containing an excess of dissolved nickel, copper, or zinc. However, I have no claim as to any special mode or means by which the metals to be saved shall be precipitated from this metal's solvent solution. This solution can be mixed and used in conjunction with the old potassium-cyanid solution and used to a good advantage with it, so as not to unnecessarily waste any of the old potassium cyanid or complex potassium-cyanid solution that may have been used in any of the former metal-solvent solutions, or this new metal-solvent solution could be used in conjunction with a potassium-cyanid solution if one had some of the latter that he did not wish to waste, though this new solvent will perform better work if no potassium cyanid is used with it.

I lay no claim to the apparatus, nor do I claim, broadly, the use of compressed air, nor do I claim any particular mode of precipitating the metals from this solution, nor do I claim any particular source from which the bromo-cyanid solution is prepared or obtained from to be used in this process, as it may be obtained from any well-known noninjurious practical source; but What I do claim as new, and desire to secure by Letters Patent of the United States, is—

1. The herein-described process of extracting gold, silver, copper, zinc and nickel from ore containing the same when in a suitable condition, which consists in subjecting said ore to the leaching action of a solution of water, containing sodium cyanid and ammonium bicarbonate, substantially as described.

2. The herein-described process of extracting gold, silver, copper, zinc and nickel from ore containing the same when in a suitable condition, which consists in subjecting said ore to the leaching action of a solution of water, containing sodium cyanid and ammonium bicarbonate, and simultaneously agitating the ore with compressed air, substantially as described.

3. The herein-described process of extracting gold, silver, copper, zinc and nickel, from ore containing the same, when in a suitable condition, which consists in subjecting said ore to the leaching action of a solution of water, containing sodium cyanid, ammonium bicarbonate and calcium hydrate, substantially as described.

4. The herein-described process of extracting gold, silver, copper, zinc and nickel, from ore containing the same, when in a suitable condition, which consists in subjecting said ore to the leaching action of a solution of water, containing sodium cyanid, ammonium bicarbonate and calcium hydrate, and simultaneously agitating the ore with the compressed air, substantially as described.

5. The herein-described process of extracting gold, silver, copper, zinc and nickel, from ore containing the same, when in a suitable condition, which consists in subjecting said ore to the leaching action of a solution of water, containing sodium cyanid, ammonium bicarbonate, calcium hydrate, bromo cyanid, substantially as described.

6. The herein-described process of extracting gold, silver, copper, zinc and nickel, from ore containing the same, when in a suitable condition, which consists in subjecting said ore to the leaching action of a solution of water, containing sodium cyanid, ammonium bicarbonate, calcium hydrate, bromo cyanid, and simultaneously agitating the ore with compressed air, substantially as described.

7. The herein-described process of extracting gold, silver, copper, zinc and nickel from ore containing the same, when in a suitable condition, which consists in subjecting said ore to the leaching action of a solution of water, containing sodium cyanid, ammonium bicarbonate, bromo cyanid, calcium hydrate and barium dioxid, substantially as described.

8. The herein-described process of extracting gold, silver, copper, zinc and nickel from ore containing the same, when in a suitable condition, which consists in subjecting said ore to the leaching action of a solution of water, containing sodium cyanid, ammonium bicarbonate, bromo cyanid, calcium hydrate and barium dioxid, and simultaneously agitating the ore with compressed air, substantially as described.

In witness whereof I have hereunto set my hand in the presence of two subscribing witnesses.

THOMAS B. JOSEPH.

Witnesses:
 FRANCIS M. WRIGHT,
 BESSIE GORFINKEL.